(12) United States Patent
Gupta et al.

(10) Patent No.: US 12,487,762 B2
(45) Date of Patent: Dec. 2, 2025

(54) FLEXIBLE PROVISIONING OF COHERENT MEMORY ADDRESS DECODERS IN HARDWARE

(71) Applicant: Intel Corporation, Santa Clara, CA (US)

(72) Inventors: Ritu Gupta, Cupertino, CA (US); Anand K. Enamandram, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 692 days.

(21) Appl. No.: 17/741,386

(22) Filed: May 10, 2022

(65) Prior Publication Data

US 2023/0367492 A1  Nov. 16, 2023

(51) Int. Cl.
*G06F 3/06* (2006.01)

(52) U.S. Cl.
CPC .......... *G06F 3/0629* (2013.01); *G06F 3/0611* (2013.01); *G06F 3/0673* (2013.01)

(58) Field of Classification Search
None
See application file for complete search history.

(56) References Cited

U.S. PATENT DOCUMENTS

| | | |
|---|---|---|
| 5,848,006 A | 12/1998 | Nagata |
| 7,191,341 B2 | 3/2007 | Paaske et al. |
| 7,287,140 B1 | 10/2007 | Asanovic et al. |
| 8,494,155 B1 | 7/2013 | Poo et al. |
| 8,516,269 B1 | 8/2013 | Hamlet et al. |
| 8,694,778 B2 | 4/2014 | Teuwen et al. |
| 8,819,685 B2 | 8/2014 | Zhang et al. |
| 8,954,788 B2 | 2/2015 | Abraham et al. |
| 9,100,427 B2 | 8/2015 | Dubrovsky et al. |
| 9,251,380 B1 | 2/2016 | Au et al. |

(Continued)

FOREIGN PATENT DOCUMENTS

| | | | |
|---|---|---|---|
| CN | 108073423 A | 5/2018 | |
| CN | 113924557 A | 1/2022 | |

(Continued)

OTHER PUBLICATIONS

Office Action and Search Report, NL App. No. 2029658, Mar. 22, 2023, 13 pages (2 pages of English Translation of NL Office Action and 11 pages of Original Document).

(Continued)

*Primary Examiner* — Edward J Dudek, Jr.
*Assistant Examiner* — Ralph A Verderamo, III
(74) *Attorney, Agent, or Firm* — Nicholson De Vos Webster & Elliott LLP

(57) ABSTRACT

Embodiments of apparatuses, methods, and systems for flexible provisioning of coherent memory address decoders in hardware are disclosed. In an embodiment, an apparatus includes a plurality of address decoders and a plurality of configuration storage locations. Each of the configuration storage locations corresponds to one of the plurality of address decoders to configure the corresponding one of the plurality of address decoders to decode based on a corresponding one of a plurality of decode rules. Each of the plurality of configuration storage locations is allocated to one of a plurality of memory tiers.

20 Claims, 9 Drawing Sheets

(56) References Cited

U.S. PATENT DOCUMENTS

| | | | |
|---|---|---|---|
| 9,584,329 B1 | 2/2017 | Trimberger | |
| 9,798,900 B2 | 10/2017 | Oh et al. | |
| 9,892,265 B1 | 2/2018 | Tripathy et al. | |
| 10,078,754 B1 | 9/2018 | Brandwine et al. | |
| 10,193,701 B2 | 1/2019 | Kim et al. | |
| 10,521,618 B1 | 12/2019 | Zhang et al. | |
| 10,742,421 B1 | 8/2020 | Wentz et al. | |
| 10,896,267 B2 | 1/2021 | Ndu et al. | |
| 10,999,263 B2 | 5/2021 | Mundra et al. | |
| 11,126,733 B2 | 9/2021 | Pappachan et al. | |
| 11,205,003 B2 | 12/2021 | Patel et al. | |
| 11,321,459 B2 | 5/2022 | Shen et al. | |
| 11,609,861 B1* | 3/2023 | Shrivastava | G06F 12/0284 |
| 11,720,672 B2 | 8/2023 | Shen et al. | |
| 11,847,067 B2 | 12/2023 | Chhabra et al. | |
| 11,874,776 B2 | 1/2024 | Chhabra et al. | |
| 2002/0097724 A1 | 7/2002 | Halme et al. | |
| 2002/0129246 A1 | 9/2002 | Blumenau et al. | |
| 2002/0133762 A1 | 9/2002 | Susnow et al. | |
| 2004/0123121 A1 | 6/2004 | Paaske et al. | |
| 2004/0158711 A1 | 8/2004 | Zimmer | |
| 2005/0021986 A1 | 1/2005 | Graunke et al. | |
| 2005/0108532 A1 | 5/2005 | Bajikar | |
| 2005/0232415 A1 | 10/2005 | Little et al. | |
| 2006/0181942 A1 | 8/2006 | Cordero et al. | |
| 2006/0193470 A1 | 8/2006 | Williams | |
| 2007/0180239 A1 | 8/2007 | Fujibayashi et al. | |
| 2008/0002590 A1 | 1/2008 | Thomas et al. | |
| 2008/0005706 A1 | 1/2008 | Sharma et al. | |
| 2008/0063197 A1 | 3/2008 | Jaquette et al. | |
| 2008/0065882 A1 | 3/2008 | Goodman et al. | |
| 2008/0222383 A1 | 9/2008 | Spracklen et al. | |
| 2010/0005375 A1 | 1/2010 | Dell et al. | |
| 2010/0023739 A1 | 1/2010 | Levit-Gurevich et al. | |
| 2010/0054466 A1 | 3/2010 | Kerins et al. | |
| 2011/0002461 A1 | 1/2011 | Erhart et al. | |
| 2011/0060915 A1 | 3/2011 | Tal | |
| 2011/0066837 A1 | 3/2011 | Lee et al. | |
| 2011/0149737 A1 | 6/2011 | Muthiah et al. | |
| 2011/0320921 A1 | 12/2011 | Gower et al. | |
| 2012/0008768 A1 | 1/2012 | Mundra et al. | |
| 2012/0030669 A1 | 2/2012 | Tsirkin | |
| 2012/0054455 A1* | 3/2012 | Wang | G06F 12/0607 |
| | | | 711/E12.079 |
| 2012/0072737 A1 | 3/2012 | Schrijen et al. | |
| 2012/0084674 A1 | 4/2012 | Visosky | |
| 2012/0137137 A1 | 5/2012 | Brickell et al. | |
| 2012/0151224 A1 | 6/2012 | Koifman et al. | |
| 2012/0151247 A1 | 6/2012 | Ferraiolo et al. | |
| 2012/0254862 A1 | 10/2012 | Dong | |
| 2013/0013934 A1 | 1/2013 | King et al. | |
| 2013/0152099 A1 | 6/2013 | Bass et al. | |
| 2014/0022976 A1 | 1/2014 | Chao et al. | |
| 2014/0059681 A1 | 2/2014 | Dubrovsky et al. | |
| 2014/0089573 A1* | 3/2014 | Sakthikumar | G06F 13/1689 |
| | | | 711/E12.001 |
| 2014/0089658 A1 | 3/2014 | Raghuram et al. | |
| 2014/0093074 A1 | 4/2014 | Gotze et al. | |
| 2014/0122902 A1 | 5/2014 | Isozaki et al. | |
| 2014/0133845 A1 | 5/2014 | Dahlfort et al. | |
| 2014/0136680 A1 | 5/2014 | Joshi et al. | |
| 2014/0189417 A1* | 7/2014 | Hum | G06F 11/006 |
| | | | 714/48 |
| 2014/0258716 A1 | 9/2014 | Macmillan et al. | |
| 2014/0270177 A1 | 9/2014 | Brickell et al. | |
| 2014/0281456 A1 | 9/2014 | Mejia et al. | |
| 2014/0359182 A1 | 12/2014 | Georgiev | |
| 2015/0046702 A1 | 2/2015 | Paaske et al. | |
| 2015/0188718 A1 | 7/2015 | Falk | |
| 2015/0288526 A1 | 10/2015 | Mclean | |
| 2015/0350231 A1 | 12/2015 | Dubrovsky et al. | |
| 2016/0019396 A1 | 1/2016 | Davis et al. | |
| 2016/0139982 A1 | 5/2016 | Yu et al. | |
| 2016/0224252 A1* | 8/2016 | Hutsell | G06F 12/0895 |
| 2016/0246967 A1 | 8/2016 | Gross et al. | |
| 2016/0323096 A1 | 11/2016 | Kara-Ivanov et al. | |
| 2016/0364582 A1 | 12/2016 | Cammarota et al. | |
| 2017/0022494 A1 | 1/2017 | Hill et al. | |
| 2017/0026171 A1 | 1/2017 | Lal et al. | |
| 2017/0090815 A1 | 3/2017 | Kelner et al. | |
| 2017/0091489 A1 | 3/2017 | Dragone et al. | |
| 2017/0093567 A1 | 3/2017 | Gopal et al. | |
| 2017/0134409 A1 | 5/2017 | Dubrovsky et al. | |
| 2017/0149572 A1 | 5/2017 | Wallrabenstein | |
| 2018/0088978 A1 | 3/2018 | Li et al. | |
| 2018/0095750 A1 | 4/2018 | Drysdale et al. | |
| 2018/0107608 A1 | 4/2018 | Kaplan et al. | |
| 2018/0189104 A1 | 7/2018 | Agarwal et al. | |
| 2018/0204007 A1 | 7/2018 | Rangayyan | |
| 2018/0367516 A1 | 12/2018 | Mundra et al. | |
| 2019/0004810 A1 | 1/2019 | Jayasimha et al. | |
| 2019/0004973 A1 | 1/2019 | Chhabra et al. | |
| 2019/0042474 A1 | 2/2019 | Edirisooriya et al. | |
| 2019/0075183 A1 | 3/2019 | Silberkasten et al. | |
| 2019/0097818 A1 | 3/2019 | Lu et al. | |
| 2019/0102293 A1 | 4/2019 | Li et al. | |
| 2019/0102568 A1 | 4/2019 | Hausauer et al. | |
| 2019/0102577 A1 | 4/2019 | Gueron et al. | |
| 2019/0116052 A1 | 4/2019 | Kim et al. | |
| 2019/0130103 A1 | 5/2019 | Shen et al. | |
| 2019/0149478 A1 | 5/2019 | Mchugh et al. | |
| 2019/0165956 A1 | 5/2019 | Adham et al. | |
| 2019/0165957 A1 | 5/2019 | Abbott et al. | |
| 2019/0227827 A1 | 7/2019 | Zmudzinski et al. | |
| 2019/0266006 A1 | 8/2019 | Cao et al. | |
| 2019/0281025 A1 | 9/2019 | Harriman et al. | |
| 2019/0311123 A1 | 10/2019 | Lal et al. | |
| 2019/0324725 A1 | 10/2019 | Wang | |
| 2019/0342093 A1 | 11/2019 | Chhabra et al. | |
| 2019/0361807 A1* | 11/2019 | Desai | G06F 12/10 |
| 2020/0004703 A1 | 1/2020 | Sankaran et al. | |
| 2020/0013451 A1 | 1/2020 | Son | |
| 2020/0034549 A1 | 1/2020 | Lu | |
| 2020/0099658 A1 | 3/2020 | Couillard et al. | |
| 2020/0110888 A1 | 4/2020 | Kim et al. | |
| 2020/0134208 A1 | 4/2020 | Pappachan et al. | |
| 2020/0143067 A1 | 5/2020 | Alemzadeh et al. | |
| 2020/0159969 A1 | 5/2020 | Shanbhogue et al. | |
| 2020/0169383 A1 | 5/2020 | Durham et al. | |
| 2020/0175646 A1 | 6/2020 | Boyd et al. | |
| 2020/0192842 A1 | 6/2020 | Ng et al. | |
| 2020/0201789 A1 | 6/2020 | Durham et al. | |
| 2020/0226263 A1 | 7/2020 | Patel et al. | |
| 2020/0266995 A1 | 8/2020 | Gopal | |
| 2020/0272562 A1* | 8/2020 | La Fratta | H04W 4/029 |
| 2020/0285492 A1 | 9/2020 | Mihajlovski et al. | |
| 2020/0319913 A1 | 10/2020 | Kumar et al. | |
| 2020/0342117 A1 | 10/2020 | Richards et al. | |
| 2020/0379664 A1 | 12/2020 | Mittal et al. | |
| 2021/0004338 A1 | 1/2021 | Marolia et al. | |
| 2021/0149728 A1 | 5/2021 | Wood et al. | |
| 2021/0157935 A1 | 5/2021 | Sood et al. | |
| 2021/0224202 A1 | 7/2021 | Chhabra et al. | |
| 2021/0232694 A1 | 7/2021 | Jannyavula Venkata | |
| 2021/0318929 A1* | 10/2021 | Guim Bernat | G06F 12/0238 |
| 2021/0319138 A1 | 10/2021 | Dewan et al. | |
| 2021/0342182 A1 | 11/2021 | Kumar et al. | |
| 2021/0382836 A1 | 12/2021 | Lantz et al. | |
| 2022/0035749 A1 | 2/2022 | Chhabra et al. | |
| 2022/0100687 A1 | 3/2022 | Sahin et al. | |
| 2022/0182232 A1 | 6/2022 | Marson et al. | |
| 2022/0198027 A1 | 6/2022 | Chhabra et al. | |
| 2022/0209966 A1 | 6/2022 | Chhabra et al. | |
| 2022/0209967 A1 | 6/2022 | Chhabra et al. | |
| 2022/0209968 A1 | 6/2022 | Chhabra et al. | |
| 2022/0209969 A1 | 6/2022 | Chhabra et al. | |
| 2022/0318144 A1 | 10/2022 | Bajic et al. | |
| 2022/0350503 A1 | 11/2022 | Tkacik et al. | |
| 2022/0416997 A1 | 12/2022 | Dewan et al. | |
| 2022/0417042 A1 | 12/2022 | Chhabra et al. | |
| 2023/0032236 A1 | 2/2023 | Sankaran et al. | |
| 2023/0032586 A1 | 2/2023 | Ranganathan et al. | |
| 2023/0102178 A1 | 3/2023 | Chhabra et al. | |
| 2023/0185603 A1 | 6/2023 | Gayen et al. | |

(56) References Cited

U.S. PATENT DOCUMENTS

| | | | |
|---|---|---|---|
| 2023/0289229 | A1 | 9/2023 | Kakaiya et al. |
| 2024/0004990 | A1 | 1/2024 | Kakaiya |
| 2024/0054011 | A1 | 2/2024 | Sankaran et al. |

FOREIGN PATENT DOCUMENTS

| | | | |
|---|---|---|---|
| CN | 114647858 | A | 6/2022 |
| CN | 115525335 | A | 12/2022 |
| CN | 115686740 | A | 2/2023 |
| CN | 117083612 | A | 11/2023 |
| CN | 118696296 | A | 9/2024 |
| DE | 102022112551 | A1 | 12/2022 |
| EP | 3547130 | A1 | 10/2019 |
| EP | 3726392 | A1 | 10/2020 |
| EP | 3757849 | A1 | 12/2020 |
| EP | 3757853 | A1 | 12/2020 |
| EP | 4016358 | A1 | 6/2022 |
| EP | 4124965 | A1 | 2/2023 |
| EP | 4152167 | A1 | 3/2023 |
| EP | 4242893 | A2 | 9/2023 |
| EP | 4322006 | A1 | 2/2024 |
| GB | 2578135 | A | 4/2020 |
| JP | 2021-064378 | A | 4/2021 |
| NL | 2029658 | A | 7/2022 |
| WO | 2011/160957 | A1 | 12/2011 |
| WO | 2019/066918 | A1 | 4/2019 |
| WO | 2021/035517 | A1 | 3/2021 |
| WO | 2021/080732 | A1 | 4/2021 |
| WO | 2021/162792 | A1 | 8/2021 |
| WO | 2022/132184 | A1 | 6/2022 |
| WO | 2023/009641 | A1 | 2/2023 |
| WO | 2023/113918 | A1 | 6/2023 |
| WO | 2023/173276 | A1 | 9/2023 |

OTHER PUBLICATIONS

Krishnan et al., "Configurable Network Protocol Accelerator (COPA)", An Integrated Networking/accelerator Hardware/Software Framework, 2020 IEEE Symposium on High-Performance Interconnects (HOTI), 2020, pp. 17-24.
Zhu et al., "Enabling Rack-scale Confidential Computing using Heterogeneous Trusted Execution Environment", 2020 IEEE Symposium on Security and Privacy, 2020, pp. 1450-1465.
U.S. Appl. No. 17/357,973, filed Jun. 24, 2021, Prashant Dewan.
U.S. Appl. No. 17/358,238, filed Jun. 25, 2021, Siddhartha Chhabra.
GDSII—Wikipedia, Retrieved from https://en.wikipedia.org/w/index.php?title=GDSII&oldid=1003588402, retrieved on Jun. 15, 2021, 3 pages.
International Preliminary Report on Patentability, PCT App. No. PCT/US2020/066279, Jun. 29, 2023, 12 pages.
Notice of Grant, NL App. No. 2029658, Jun. 13, 2023, 5 pages of Original Document Only.
Non-Final Office Action, U.S. Appl. No. 17/358,238, Aug. 8, 2024, 31 pages.
Non-Final Office Action, U.S. Appl. No. 17/478,828, Oct. 31, 2024, 09 pages.
Non-Final Office Action, U.S. Appl. No. 17/483,123, Nov. 25, 2024, 09 pages.
Office Action , EP App. No. 22181090.6, Oct. 9, 2024, 7 pages.
"Intel Data Streaming Accelerator Architecture Specification," Revision 1.2, 197 pages, Sep. 2021.
"Intel® QuickAssist Technology (Intel® QAT)—Data Center Performance," downloaded Jun. 12, 2022, from https://www.intel.com/content/www/us/en/architecture-and-technology/intel-quick-assist-technology-overview.html, 6 pages.
"Smart Data Accelerator Interface ("SDXI") Specification," Version 0.9.0 rev 1, SNIA Advancing Storage & Information Technology, 109 pages.
European Search Report for application No. 22188217.8-1203, issued Feb. 3, 2023, 16 pages.
European Search Report, Application No. EP22181090, issued Dec. 7, 2022, 7 pages.
Extended European Search Report for application No. 22188217.8, issued May 8, 2023, 13 pages.
International Search Report for application No. PCT/US2022/047184, issued Feb. 15, 2023, 3 pages.
Iyer, Shymakumar, "Introducing Smart Data Acceleration Interface (SDXI)," In-Memory Computing Summit (Oct. 28, 2020).
J. Won, A. Singla, E. Bertino and G. Bollella, "Decentralized Public Key Infrastructure for Internet-of-Things," MILCOM 2018—2018 IEEE Military Communications Conference (MILCOM), Los Angeles, CA, USA, 2018, pp. 907-913.
Partial European Search Report for application No. 23156058.2, issued Jul. 26, 2023, 14 pages.
Intel, "Intel® Architecture Memory Encryption Technologies", Specification, Revision 1.3, Document No. 336907-003US, Apr. 2021, pp. 1-33.
Samsung Newsroom, "Samsung Unveils Industry-First Memory Module Incorporating New CXL Interconnect Standard", Available Online at <https://news.samsung.com/global/samsung-unveils-industry-first-memory-module-incorporating-new-cxl-interconnect-standard>, May 11, 2021, pp. 1-5.
Office Action, EP App. No. 22188184.0, Jul. 22, 2024, 5 pages.
European Search Report and Search Opinion, EP App. No. 22188184.0, Jan. 25, 2023, 8 pages.
European Examination Report for app. No. 21198475.2, issued Jan. 4, 2024, 5 pages.
Extended European search report for application No. 23191363.3, issued Nov. 30, 2023, 11 pages.
Intel Corporation. Intel® Architecture Memory Encryption Technologies Specification. Ref: #336907-001US. Rev 1.1. Dec. 2017. (Year: 2017), 33 pages.
Intel, "Intel® Data Streaming Accelerator Preliminary Architecture Specification", Order No. 341204-001 US, Revision: 1.0, Nov. 2019, 125 pages.
International Preliminary Report on Patentability and Written Opinion (International app. No. PCT/US2022/021446), issued Dec. 14, 2023, 5 pages.
International Preliminary Report on Patentability and written opinion (international application No. PCT/US2022/021531), issued Dec. 14, 2023, 5 pages.
"Hyperscale computing—load balancing for large quantities of data", available online at <https://www.ionos.com/digitalguide/server/know-how/what-is-hyperscale/>, 2020, 8 pages.
Dave Jiang, "Introducing the Intel® Data Streaming Accelerator (Intel® DSA)", Nov. 20, 2019, 6 pages.
Extended European Search Report, EP App. No.23156058.2, Oct. 26, 2023, 13 pages.
IBM, "What is multi-tenant?", available online at <https://www.ibm.com/topics/multi-tenant>, Jan. 20, 2020, 6 pages.
International Search Report and Written Opinion, PCT App. No. PCT/US2024/012458, Nov. 15, 2022, 4 pages.
Jack Keil Wolf, "An Introduction to Error Correcting Codes Part 1", 2008, 146 pages.
Non-Final Office Action, U.S. Appl. No. 17/133,627, Feb. 15, 2024, 23 pages.
Priebe et al., "EnclaveDB: A Secure Database using Sgx", IEEE Symposium on Security and Privacy, 2018, 15 pages.
SNIA, "Smart Data Accelerator Interface ("SDXI") Specification", Version 1.0, Nov. 28, 2022, 144 Pages.
Unter!uggauer et al., "MEAS: memory encryption and authentication secure against side-channel attacks", journal of Cryptographic Engineering, 2019, 22 pages.
Werner et al., "Transparent Memory Encryption and Authentication", 2023, 6 pages.
Wikipedia, "Disk_encryption_theory", available online at <https://en.wikipedia.org/wiki/Disk_encryption_theroy#XTS>, 2023, 7 pages.
Written Opinion Of The International Searching Authority, PCT App. No. PCT/US2022/047184, Feb. 15, 2023, 6 pages.
Written Opinion Of The International Searching Authority, PCT App. No. PCT/US2022/038546, Nov. 15, 2022, 5 pages.
AMD, "Tiered Memory Page Migration Operations Guide", Revision: 0.51, May 2023, 33 Pages.

(56) References Cited

OTHER PUBLICATIONS

Final Office Action, U.S. Appl. No. 17/133,627, Aug. 5, 2024, 28 pages.
Final Office Action, U.S. Appl. No. 17/358,287, Feb. 22, 2024, 22 pages.
Intel, "Intel® Data Streaming Accelerator Architecture Specification", Order No. 341204-004US Revision: 2.0 Sep. 2022, 253 Pages.
Intel, "Intel® Scalable I/O Virtualization", Technical Specification, Order No. 337679-002, Rev 1.1, Sep. 2020, 29 Pages.
Intel, "Intel® TDX Connect Architecture Specification", 354629 001-US, Mar. 2023, 40 pages.
International Search Report and Written Opinion, PCT App. No. PCT/CN2022/080895, Nov. 28, 2022, 08 pages.
Non-Final Office Action in U.S. Appl. No. 17/711,928, mailed Aug. 26, 2024, 22 pages.
Non-Final Office Action, U.S. Appl. No. 17/357,973, Oct. 1, 2024, 14 pages.
Notice of Allowance, U.S. Appl. No. 17/482,370, Jul. 30, 2024, 8 pages.
Zhao et al., "Contiguitas: The Pursuit of Physical Memory Contiguity in Datacenters", ACM, Jun. 17-21, 2023, 15 Pages.

* cited by examiner

FLEXIBLE PROVISIONING OF COHERENT MEMORY ADDRESS DECODERS IN HARDWARE

TECHNICAL FIELD

The technical field relates generally to information processing systems, and, more specifically, but without limitation, to addressing memory in information processing systems.

BACKGROUND

Information processing systems may include memories with different types, technologies, arrangements, modes, topologies, interface/interconnect protocols, etc.

BRIEF DESCRIPTION OF THE DRAWINGS

Various embodiments in accordance with the present disclosure will be described with reference to the drawings, in which.

DETAILED DESCRIPTION

Figure 1:
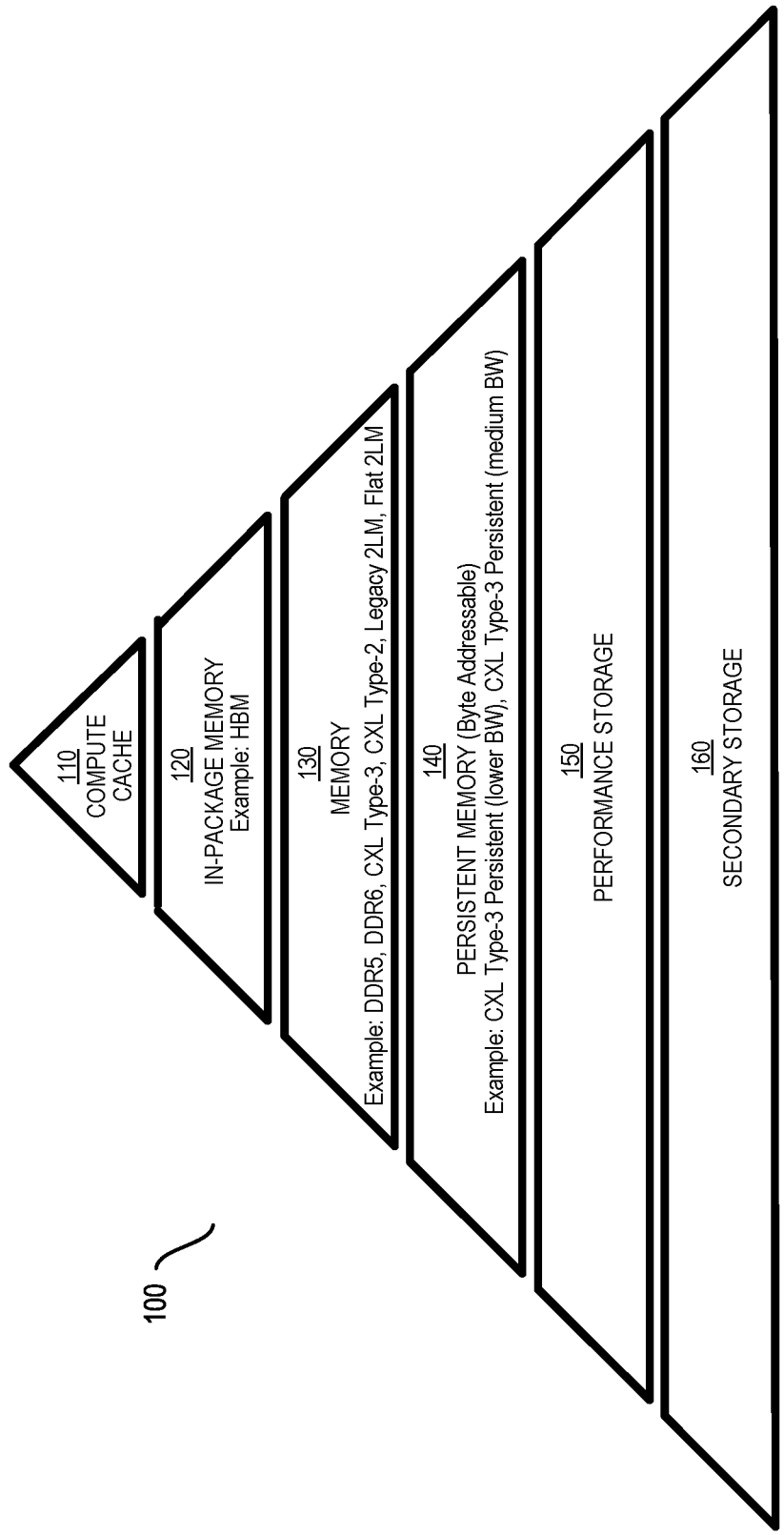
FIG. 1 is a diagram of a memory technology hierarchy that may be correlated memory performance tiers according to embodiments.

The present disclosure relates to methods, apparatuses, systems, and non-transitory computer-readable storage media for addressing memory in information processing systems.

As mentioned in the background section, computers, information processing systems, and other electronic products may include memories with different types, technologies, arrangements, modes, topologies, interface/interconnect protocols, etc. (e.g., double data rate (DDR) synchronous dynamic random-access memory (SDRAM), Compute Express Link (CXL), high-bandwidth memory (HBM), in-package memory, one-level memory (1LM), two-level memory (2LM)). Embodiments may be used to provide a coherent view of system memory despite any such differences, with greater flexibility, greater performance, lower cost, and/or lower complexity than existing approaches.

For example, some existing central processing units (CPUs) use a flat address decoding scheme with one system address decoder (SAD) rule per memory device, technology, and/or mode, where each rule specifies a mapping to a single, independent physical address range in a system memory map. Each such rule or mapping may be defined by settings in one or more configuration registers. Therefore, existing CPU designs may provide for enough SAD rules, and associated decoders and configuration space, to support many different memory technologies/modes, plus extras to provide headroom for possible future technologies/modes. Thus, the number of SAD rules may grow with each generation of CPU design, presenting a scalability issue as well as adding cost and complexity and decreasing performance (e.g., by increasing memory latency because SAD rules are always in the critical path for memory requests).

In contrast, embodiments may provide for a fixed number of memory address decoding tiers that may accommodate any number of memory types, technologies, arrangements, modes, topologies, interface/interconnect protocols, etc. (e.g., DDR SDRAM, CXL, HBM, medium-bandwidth memory, low-bandwidth memory, in-package memory, 1LM, 2LM, volatile, persistent, basic/legacy usage, virtual machine monitor (VMM) range usage, near memory, far memory, application direct memory, dual-inline memory module (DIMM), magnetic random-access memory, ferro-electric random-access memory, future memory types and/or media that may become prevalent and/or be used in the future). Thus, embodiments may provide for scalability and/or the use of any number of future memory technology/modes, thus avoiding a need to predict future memory usage models, to estimate the number of SAD rules per CPU socket desired two to five years in the future, and/or to upsize the number of SAD rules per CPU socket to account for conservative worst-case and/or future memory usage models.

Embodiments may include flexible provisioning of coherent memory address decoders in hardware, such as a CPU, processor, or processor core or other hardware accessible by a CPU, processor, or processor core. The CPU, processor, or processor core may be represented, for example, by any of processor 470 or 480 in FIG. 4, processor 500 in FIG. 5, core 520A or 520N in FIG. 5, and/or core 690 in FIG. 6((B) and the other hardware may be represented, for example, by any of chipset 490 or bridge 418 in FIG. 4. In the following description, a CPU, processor, or processor core according to embodiments may be referred to interchangeably as a CPU, processor, processor core, or core.

In embodiments, a CPU may access memory according to an addressing scheme in which the system memory space is composed of a fixed number of tiers, each having associated with it a pool of configurable address decoders such that one or more SAD rules, address mappings, and/or decode settings, parameters, etc. (any or any group of which may be referred to, for convenience, as a decode rule, a decoder rule, a decoding rule, or a SAD rule) may be implemented for each tier. As such, the CPU may include and/or have access to configuration registers and/or storage locations to define the SAD rule(s) for each tier. In embodiments, the tiers may be defined according to a software-based view of memory and any combination of its corresponding bandwidth (BW) and latency characteristics (e.g., idle latency, loaded latency (loaded at different points of the BW/latency curve)). In embodiments, systems may include, within each tier, varied memory technologies, modes, etc. within the constraints of the SAD rules provisioned for that tier, such that the system may satisfy the functional requirements of various types of software applications that use a wide variety of memory attributes.

In embodiments, the flexibility provided by the pools of configurable address decoders may allow for fewer SAD rule entries than existing approaches, thus improving system performance by reducing memory address decoding latency. In embodiments, systems may be populated with a variety of memory devices post-launch in-field, instead of requiring system memory decisions to be made ahead of productization. In embodiments, systems may include newly introduced memory technologies that fit into the existing tiers. In embodiments, the system memory map may include addresses, ranges, and/or areas through which input/output (I/O) devices, peripherals, accelerators, etc. may be accessed (e.g., memory-mapped I/O (MMIO)).

As an example, FIG. 1 is a diagram of a memory technology hierarchy 100 that may be correlated to the memory performance tiers of Table 1 according to embodiments. Memory technology hierarchy 100 includes six levels (other embodiments may include fewer or more levels), ordered top-to-bottom, from highest to lowest performance characteristics: compute cache 110, in-package memory 120 (e.g., HBM), memory 130 (e.g., DDR5, DDR6, CXL Type 3, CXL Type 2, Legacy 2LM, Flat 2LM), persistent memory 140 (byte-addressable, e.g., CXL Type 3 Persistent (lower BW), CXL Type 3 Persistent (medium BW)), performance storage 150, and secondary storage 160.

TABLE 1

Memory Performance Tiers

| SAD Decoder Pool/ BW Tier | Memory Type (from FIG. 1) | Usage | Proposed SAD Rule Allocations |
|---|---|---|---|
| Fixed Decoder Pool | Memory (Standard) | 0-4 GB, VMM, xNC-Only Ranges | 4 |
| High-BW Tier Pool | In-Package Memory | High-BW Memory | 1 |
| Medium-BW Tier Pool | Memory (Standard) | Traditional Memory | 4 |
| Low-BW Tier Pool | Persistent Memory | Low-BW/Persistence Tier | 2 |
| Non-Existent Memory (NXM) Pool | Multiple Types | Account for Memory Holes | 4 |
| Asymmetric Capacity Pool | Multiple Types | Support Asymmetric Memory Capacities | 4 |
| | | Total | 19 |

Table 1 shows an example of memory performance tiers into which memory types/devices (e.g., as shown in FIG. 1) may be assigned according to embodiments, and a corresponding number of decoder/SAD rule allocations per tier. Other performance tiers, usages, and/or decoder/SAD rule allocations may be used in other embodiments, any of which may be based on estimating and implemented by provisioning decoder/SAD rules in a CPU or other processor. In embodiments, performance tiers, usages, and/or decoder/SAD rules allocations may be chosen (e.g., as shown in Table 1) based on a system software view of memory ranges, viz, to an operating system, VMM, or driver, different memory ranges are distinguished primarily on performance characteristics (e.g., BW/latency) that the ranges offer. Other attributes such as capacity and persistence may also be considered.

According to the embodiment of Table 1, three primary pools of decoder/SAD rules based on memory tier (High-BW, Medium-BW, and Low-BW) and three auxiliary pools of decoder/SAD rules (Fixed, NXM, and Asymmetric Capacity), as explained below, are provisioned. Each of the primary decoder pools caters to a specific memory bandwidth tier, and each has a fixed number of address decoders. The auxiliary address decoder pools may be based on legacy/specific usages, and the corresponding rules may be carried forward from generation to generation to maintain backward compatibility or satisfy other system constraints.

The High-BW Tier Pool may be used for memory technologies including in-package memory 120 in FIG. 1 and/or memories offering a high bandwidth (such as HBM, on-die static random-access memory (SRAM), etc.) compared to traditional DDR memory. The Medium-BW Tier Pool may be used for memory technologies including memory 130 in FIG. 1 and/or memories considered standard/traditional or equivalent (such as DDR5, 1LM, 2LM, far memory, CXL Type-3 volatile memory, CXL Type-2 memory, etc.). The Low-BW Tier Pool may be used for memory technologies including memory 140 in FIG. 1 and/or offering a low bandwidth (such as CXL Type-3 persistent memory, emerging storage devices that could support byte addressable memory, etc.) compared to traditional DDR memory.

The Fixed Decoder Pool address decoders may be used for address ranges that stay fixed over multiple CPU/processor generations, rarely change, and/or are not tied to memory technology but driven by platform requirements (e.g., 0-4 GB basic/legacy address ranges for x86), system software (e.g., VMM address range, external node controller (xNC) address range), or other system artifact.

The Asymmetric Capacity Pool address decoders may be used to support separate address ranges for memory devices that have asymmetric capacity compared to other channels, and/or may be used for DDR5, CXL, etc.

The NXM Pool address decoders may be used for alignment purposes, such as to account for holes in the system address map imposed by the CPU/processor or system to satisfy constraints. For example, the CPU design may require all address ranges to be 1 GB aligned, but devices may be built in a non-1 GB aligned manner, so an NXM rule may be used to plug the memory hole by programming a SAD rule for the memory range and tagging it to the CPU as an NXM memory range so that the CPU handles transactions to this range appropriately without causing errors or system hang. In embodiments, in response to a read to an NXM range, the CPU may return all ones, all zeros, or some other designated value or signature indicative of an inaccessible range (e.g., 0xDEAD) and/or that a software driver or OS may be written to recognize, and/or in response to a write to an NXM range, drop the transaction or return a message that the transaction is invalid.

In embodiments, the address decoder pools may be implemented as separate sets of configuration registers programmable by firmware such as Unified Extensible Firmware Interface (UEFI) firmware, Baseboard Management Controller (BMC) firmware, a basic input/output system (BIOS), other pre-boot firmware, other configurator logic, etc. For scalability and to optimize overall gate count, each decoder pool may have unique registers (e.g., configuration space registers or control and status registers, either of which may be referred to as CSRs) defined with only the appropriate software programmable fields that are relevant for that pool, versus an existing one-size-fits-all approach (e.g., all configuration space includes all fields for all SAD rules).

Details of which fields could be in each decoder pool may be implementation specific. In embodiments, the CSRs for the primary pools discussed above and intended to service various memory device types may be defined with fields to distinguish between various classes of devices (e.g., memory device, accelerator device), fields to determine other memory attributes (e.g., volatile, persistent), etc. In embodiments, the CSRs for the NXM pool discussed above and intended for memory that is not actually backed up by a valid memory device may include fields for a simple base/limit combination with no other fields, thus simplifying implementation and reducing overall gate count. In embodiments, the CSRs for the fixed decoder pool may be implemented without base/limit combination fields for fixed base/limit combinations (e.g., 0-4 GB), thus further reducing overall gate count.

Figure 2:
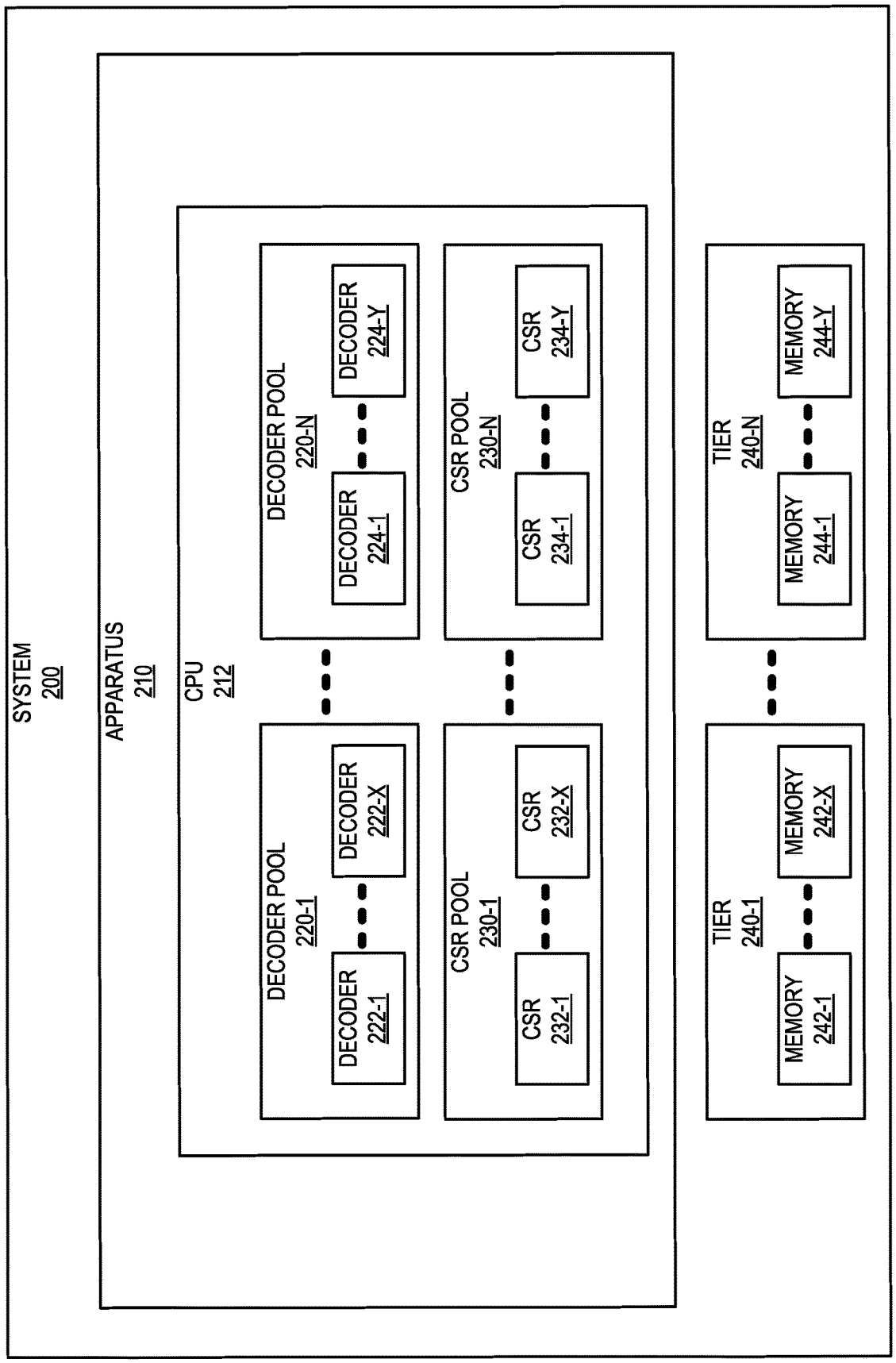
FIG. 2 is a block diagram of a system including an apparatus for flexible provisioning of coherent memory address decoders in hardware according to embodiments.

FIG. 2 is a block diagram of a system 200 including an apparatus 210 for flexible provisioning of coherent memory address decoders in hardware according to embodiments. In embodiments, the hardware of apparatus 210 (e.g., memory address decoders and CSRs (or other storage)) may be implemented in logic gates, memory cells, and/or any other circuitry or hardware in or accessible by a CPU, processor, or core (e.g., processor 470 or 480 in FIG. 4, processor 500 in FIG. 5, core 520A or 520N in FIG. 5, core 690 in FIG. 6((B), and/or chipset 490 or bridge 418 in FIG. 4) and any number of them may be integrated into a single chip or system-on-chip (SoC) or distributed across any number of chips, chiplets, modules, packages, etc.

As shown in FIG. 2, apparatus 210 includes a CPU 212 and any number of address decoder pools 220-1 to 220-N, where each address decoder pool includes any number (which may differ per pool) of configurable address decoders (shown as 222-1 to 222-X in address decoder pool 220-1 and as 224-1 to 224-Y in address decoder pool 220-N). In embodiments and as shown in FIG. 2, the decoders and CSRs may be within the CPU or an SoC including the CPU (and therefore quick to access); however, one or more of either or both may be outside the CPU or CPU SoC in other embodiments. For each address decoder, apparatus 210 includes or has access to one or more CSRs (shown as 232-1 to 232-X for address decoder pool 220-1 and as 234-1 to 234-Y for address decoder pool 220-N) or other storage to be programmed with and to store a corresponding decode/SAD rule for the address decoder and to be accessed by the address decoder to decode an address provided by the CPU (e.g., according to the CPU's view of system memory). By the pairing of address decoders with CSRs (e.g., decoder 222-1 paired with CSR 232-1, decoder 222-X paired with CSR 232-X, decoder 224-1 paired with CSR 234-1, decoder 224-Y paired with CSR 234-Y), the CSRs may also be considered to be arranged in CSR pools (shown as 230-1 to 230-N) corresponding to the decoder pools (e.g., 220-1 to 220-N, respectively).

As shown in FIG. 2, apparatus 200 includes a CPU, address decoders, and CSRs; however, in various embodiments, a CPU may be separate from the apparatus including one or more of the address decoders and/or CSRs, and/or one or more of the address decoders and/or CSRs may be integrated into a processor core and/or a processor uncore, system agent, or other circuitry. Embodiments may also be implemented without CSRs as shown in FIG. 2. For example, software may program the base/limit of certain memory ranges to a known/fixed programmable system memory address location. As another example, the decode rules could be stored in another location on or off of the CPU package that is lower cost to implement, possibly at the expense of access latency (which may be an acceptable trade-off if the address range described by the values are not high-performance address ranges).

System 200 may also include a number of memory tiers 240-1 to 240-N, such that each memory tier corresponds to a decoder pool (e.g., 220-1 to 220-N, respectively) and a CSR pool (e.g., 230-1 to 230-N, respectively). Each memory tier may include a number (which may differ per tier) of memory (e.g., DIMMs, CXL drives) or other addressable devices (shown as 242-1 to 242-X in memory tier 240-1 and as 244-1 to 244-Y in memory tier 240-N). Each of the memory devices corresponds to one of the decoder/CSR pairs (e.g., memory 242-1 corresponds to decoder 222-1 and CSR 232-1, memory 242-X corresponds to decoder 222-X and CSR 232-X, memory 244-1 corresponds to decoder 224-1 and CSR 234-1, memory 244-Y corresponds to decoder 224-Y and CSR 234-Y) based on the physical address range(s) hosted by the memory device; therefore, each of the memory tiers corresponds to one of the address decoder pools and to one of the CSR pools.

In embodiments, the address decoder pools, and therefore the memory tiers, may be differentiated by differences among the formats of the corresponding CSRs (e.g., all of CSRs 232-1 to 232-X have a first format, all of CSRs 234-1 to 234-Y have a second format, and the first format is different than the second format). The differences in formats may include differences in fields, as described above, and/or any other differences that may be useful or desired to provide programmability of the CSRs for the different varieties of decode/SAD rules possible for different memory technologies, device types, etc.

Figure 3:
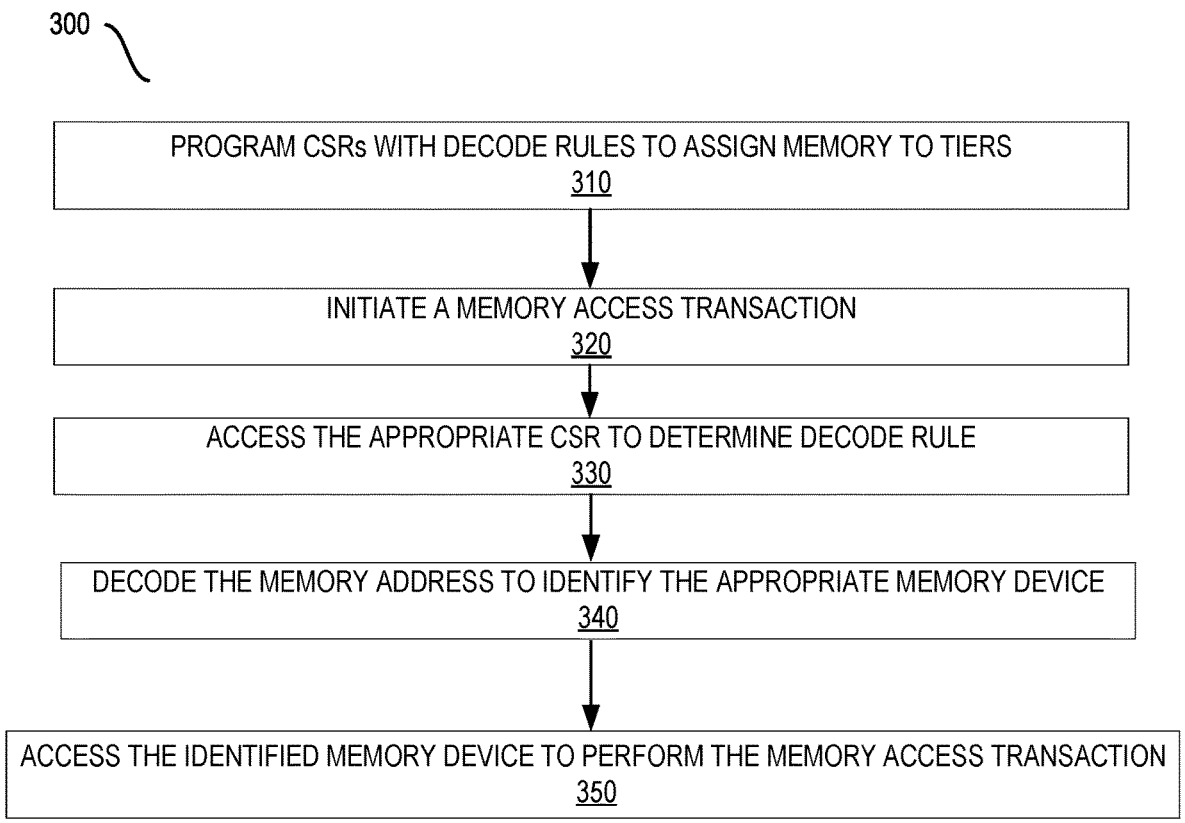
FIG. 3 is a flow diagram of a method for flexible provisioning of coherent memory address decoders in hardware according to embodiments

FIG. 3 is a flow diagram of a method 300 for flexible provisioning of coherent memory address decoders in hardware according to embodiments. In FIG. 3, block 310 represents programming, e.g., by BIOS or other pre-boot firmware, a separate set of CSRs or other configuration storage for each of a number of decoder pools. Each of the number of decoder pools corresponds to one of a number of memory performance tiers, such that each of a variety of memory device types may be assigned to an appropriate tier based on bandwidth, latency, persistence, capacity, and/or other performance or other characteristics. Each decoder pool may support a number, which may differ per tier, of decode/SAD rules, such that a number, which may differ per tier, of memory devices may be assigned to each tier.

Block 320 represents initiating (e.g., by a CPU, processor, or processor core) a memory access (e.g., read or write) transaction to a memory address according to the CPU, processor, or core's view of system memory. Block 330 represents accessing one of the CSRs to determine a decode/SAD rule corresponding to an address range including the memory address. As described above, each of the CSRs is allocated to one of the memory tiers.

Block 340 represents decoding, by an address decoder, the memory address to identify a memory device hosting the corresponding physical memory address. The decoding is performed according to the decode/SAD rule determined in block 330. Block 350 represents accessing (e.g., by or through a controller, agent, bridge, switch, access circuit/logic, etc.) the memory device to perform or complete the memory access transaction.

Example Embodiments

In embodiments, an apparatus includes a plurality of address decoders and a plurality of configuration storage locations. Each of the configuration storage locations corresponds to one of the plurality of address decoders to configure the corresponding one of the plurality of address decoders to decode based on a corresponding one of a plurality of decode rules. Each of the plurality of configuration storage locations is allocated to one of a plurality of memory tiers.

Any such embodiments may include any or any combination of the following aspects. At least a first of the plurality of memory tiers may be differentiated from at least a second of the plurality of memory tiers by a difference between a format of a first configuration storage location corresponding to the first of the plurality of memory tiers and a format of a second configuration storage location corresponding to the second of the plurality of memory tiers. The difference may be based at least in part on a memory performance characteristic. The memory performance characteristic may be bandwidth. The memory performance characteristic may be latency. The format of the first configuration storage location may include a first field to distinguish between a first device type and a second device type. The first device type may include memory and the second device type may include accelerator. The first device type may include volatile and the second device type may include persistent. The format of the first configuration storage location may include a first field for a base address. The format of the first configuration storage location may include a second field for a limit. The difference may be based at least in part on the format of the first configuration location having no field for a device type. The difference may be based at least in part on the format of the second configuration location having no field for a base address.

In embodiments, a method includes initiating, by a processor, a memory access transaction to a first memory address; accessing one of a plurality of configuration storage locations to determine a decode rule corresponding to an address range including the first memory address, wherein each of the plurality of configuration storage locations is allocated to one of a plurality of memory tiers; decoding, by an address decoder in one of a plurality of decoder pools, the first memory address to identify a memory device hosting a corresponding second memory address, wherein the decoding is based on the decode rule; and accessing the memory device to perform the memory access transaction.

Any such embodiments may include any or any combination of the following aspects. The method may also include programming the one of the plurality of configuration storage locations with the decoding rule to assign the memory device to one of the plurality of memory tiers. At least a first of the plurality of memory tiers may be differentiated from at least a second of the plurality of memory tiers by a difference between a format of a first configuration storage location corresponding to the first of the plurality of memory tiers and a format of a second configuration storage location corresponding to the second of the plurality of memory tiers. The difference may be based at least in part on a memory performance characteristic. The memory performance characteristic may be bandwidth. The memory performance characteristic may be latency. The format of the first configuration storage location may include a first field to distinguish between a first device type and a second device type. The first device type may include memory and the second device type may include accelerator. The first device type may include volatile and the second device type may include persistent. The format of the first configuration storage location may include a first field for a base address. The format of the first configuration storage location may include a second field for a limit. The difference may be based at least in part on the format of the first configuration location having no field for a device type. The difference may be based at least in part on the format of the second configuration location having no field for a base address.

In embodiments, a system includes a plurality of memory devices; a plurality of address decoders; and a plurality of configuration storage locations, each of the configuration storage locations corresponding to one of the plurality of address decoders to configure the corresponding one of the plurality of address decoders to decode based on a corresponding one of a plurality of decode rules; wherein each of the plurality of configuration storage locations is allocated to one of a plurality of memory tiers, the plurality of memory tiers including the plurality of memory devices.

Any such embodiments may include any or any combination of the following aspects. At least a first of the plurality of memory tiers may be differentiated from at least a second of the plurality of memory tiers by a difference between a format of a first configuration storage location corresponding to the first of the plurality of memory tiers and a format of a second configuration storage location corresponding to the second of the plurality of memory tiers. The difference may be based at least in part on a memory performance characteristic. The memory performance characteristic may be bandwidth. The memory performance characteristic may be latency. The format of the first configuration storage location may include a first field to distinguish between a first device type and a second device type. The first device type may include memory and the second device type may include accelerator. The first device type may include volatile and the second device type may include persistent. The format of the first configuration storage location may include a first field for a base address. The format of the first configuration storage location may include a second field for a limit. The difference may be based at least in part on the format of the first configuration location having no field for a device type. The difference may be based at least in part on the format of the second configuration location having no field for a base address.

In embodiments, an apparatus may include means for performing any function disclosed herein. In embodiments, an apparatus may include a data storage device that stores code that when executed by a hardware processor or controller causes the hardware processor or controller to perform any method or portion of a method disclosed herein. In embodiments, an apparatus may be as described in the detailed description. In embodiments, a method may be as described in the detailed description. In embodiments, a non-transitory machine-readable medium may store instructions that when executed by a machine causes the machine to perform any method or portion of a method disclosed herein. Embodiments may include any details, features, etc. or combinations of details, features, etc. described in this specification.

Example Computer Architectures

Detailed below are describes of example computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
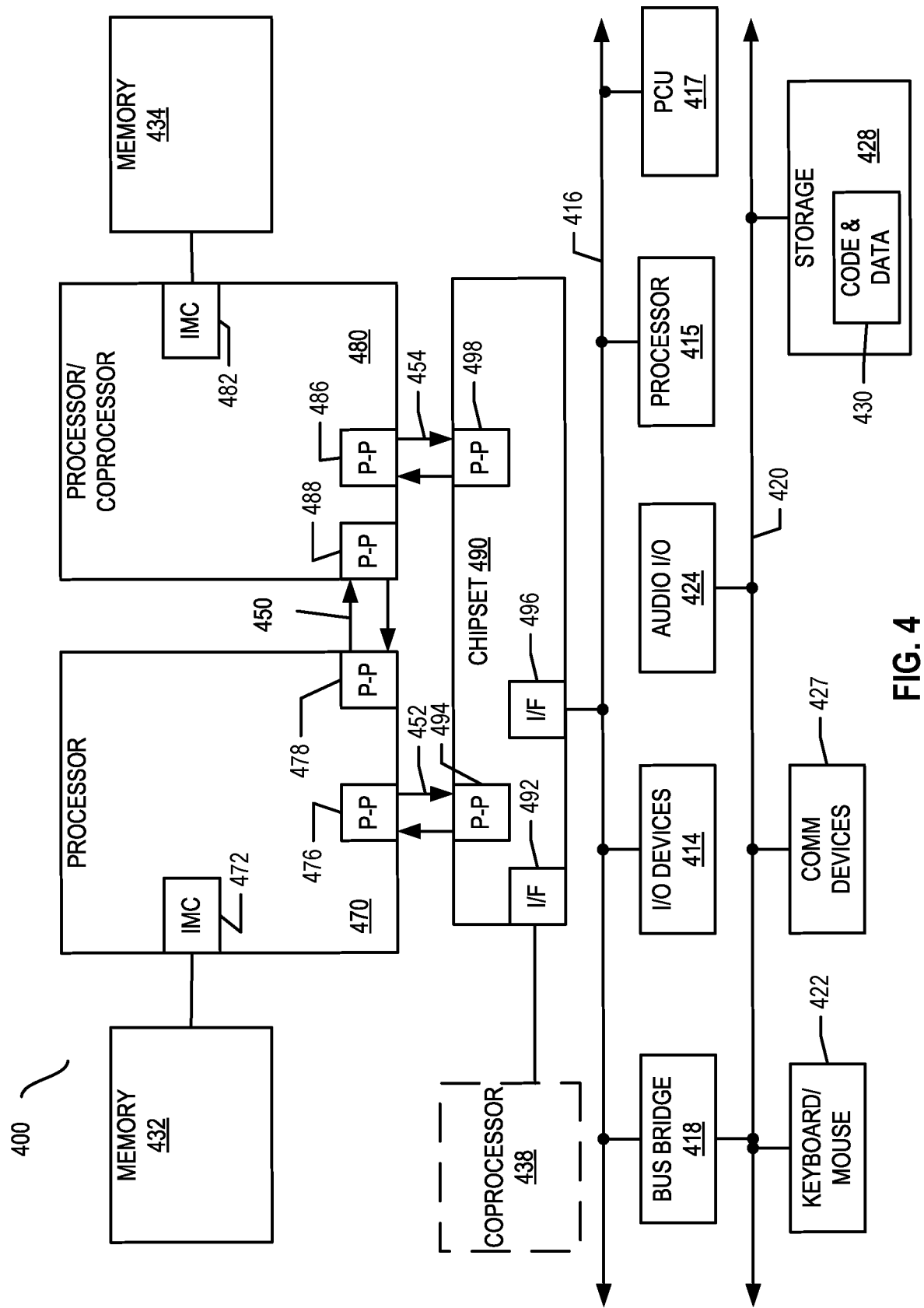
FIG. 4 illustrates embodiments of an example system.

FIG. 4 illustrates embodiments of an example system. Multiprocessor system 400 is a point-to-point interconnect system and includes a plurality of processors including a first processor 470 and a second processor 480 coupled via a point-to-point interconnect 450. In some embodiments, the first processor 470 and the second processor 480 are homogeneous. In some embodiments, first processor 470 and the second processor 480 are heterogenous.

Processors 470 and 480 are shown including integrated memory controller (IMC) unit circuitry 472 and 482, respectively. Processor 470 also includes as part of its interconnect controller units' point-to-point (P-P) interfaces 476 and 478; similarly, second processor 480 includes P-P interfaces 486 and 488. Processors 470, 480 may exchange information via the point-to-point (P-P) interface 450 using P-P interface circuits 478, 488. IMCs 472 and 482 couple the processors 470, 480 to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with a coprocessor 438 via a high-performance interface 492. In some embodiments, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor 470, 480 or outside of both processors, yet connected with the processors via P-P interconnect, such that either or both processors' local cache information may be stored in the shared cache if a processor is placed into a low power mode.

Chipset 490 may be coupled to a first interconnect 416 via an interface 496. In some embodiments, first interconnect 416 may be a Peripheral Component Interconnect (PCI) interconnect, or an interconnect such as a PCI Express interconnect or another I/O interconnect. In some embodiments, one of the interconnects couples to a power control unit (PCU) 417, which may include circuitry, software, and/or firmware to perform power management operations with regard to the processors 470, 480 and/or co-processor 438. PCU 417 provides control information to a voltage regulator to cause the voltage regulator to generate the appropriate regulated voltage. PCU 417 also provides control information to control the operating voltage generated. In various embodiments, PCU 417 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 417 is illustrated as being present as logic separate from the processor 470 and/or processor 480. In other cases, PCU 417 may execute on a given one or more of cores (not shown) of processor 470 or 480. In some cases, PCU 417 may be implemented as a microcontroller (dedicated or general-purpose) or other control logic configured to execute its own dedicated power management code, sometimes referred to as P-code. In yet other embodiments, power management operations to be performed by PCU 417 may be implemented externally to a processor, such as by way of a separate power management integrated circuit (PMIC) or another component external to the processor. In yet other embodiments, power management operations to be performed by PCU 417 may be implemented within BIOS or other system software.

Various I/O devices 414 may be coupled to first interconnect 416, along with an interconnect (bus) bridge 418 which couples first interconnect 416 to a second interconnect 420. In some embodiments, one or more additional processor(s) 415, such as coprocessors, high-throughput MIC processors, GPGPU's, accelerators (such as, e.g., graphics accelerators or digital signal processing (DSP) units), field programmable gate arrays (FPGAs), or any other processor, are coupled to first interconnect 416. In some embodiments, second interconnect 420 may be a low pin count (LPC) interconnect. Various devices may be coupled to second interconnect 420 including, for example, a keyboard and/or mouse 422, communication devices 427 and a storage unit circuitry 428. Storage unit circuitry 428 may be a disk drive or other mass storage device which may include instructions/code and data 430, in some embodiments. Further, an audio I/O 424 may be coupled to second interconnect 420. Note that other architectures than the point-to-point architecture described above are possible. For example, instead of the point-to-point architecture, a system such as multiprocessor system 400 may implement a multi-drop interconnect or other such architecture.

Example Core Architectures, Processors, and Computer Architectures

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Example core architectures are described next, followed by descriptions of example processors and computer architectures.

Figure 5:
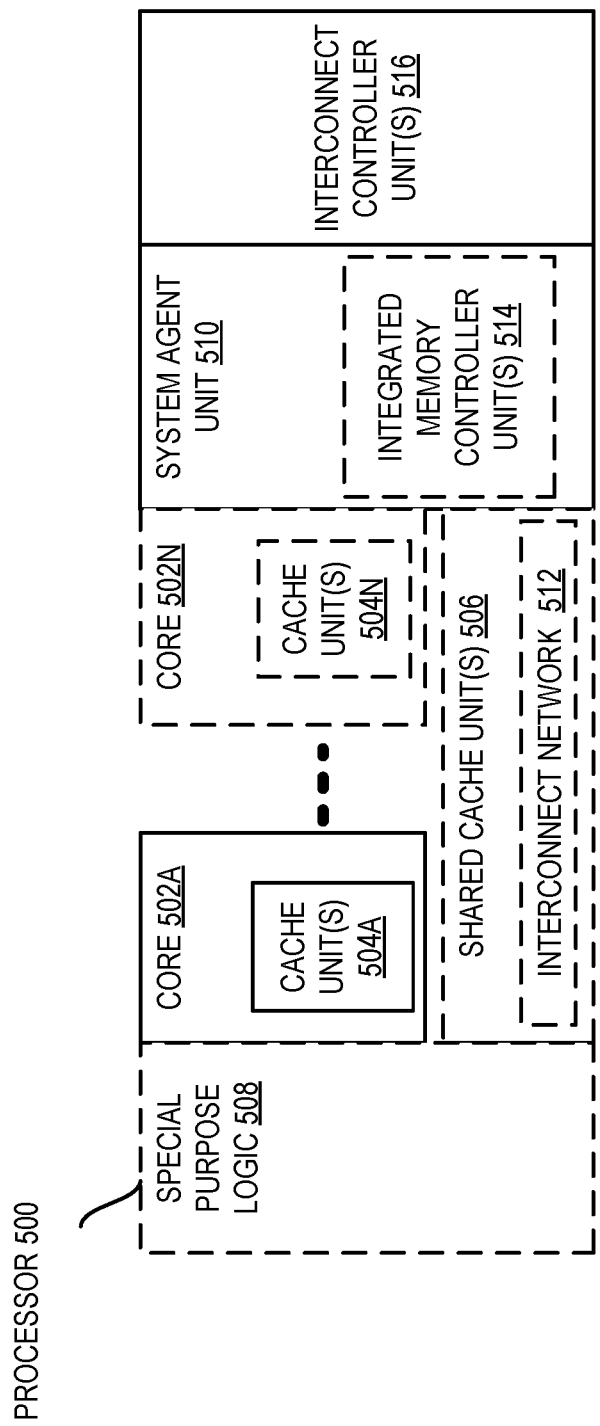
FIG. 5 illustrates a block diagram of embodiments of a processor that may have more than one core, may have an integrated memory controller, and may have integrated graphics.

FIG. 5 illustrates a block diagram of embodiments of a processor 500 that may have more than one core, may have an integrated memory controller, and may have integrated graphics. The solid lined boxes illustrate a processor 500 with a single core 502A, a system agent 510, a set of one or more interconnect controller units circuitry 516, while the optional addition of the dashed lined boxes illustrates an alternative processor 500 with multiple cores 502(A)-(N), a set of one or more integrated memory controller unit(s) circuitry 514 in the system agent unit circuitry 510, and special purpose logic 508, as well as a set of one or more interconnect controller units circuitry 516. Note that the processor 500 may be one of the processors 470 or 480, or co-processor 438 or 415 of FIG. 4.

Thus, different implementations of the processor 500 may include: 1) a CPU with the special purpose logic 508 being integrated graphics and/or scientific (throughput) logic (which may include one or more cores, not shown), and the cores 502(A)-(N) being one or more general purpose cores (e.g., general purpose in-order cores, general purpose out-of-order cores, or a combination of the two); 2) a coprocessor with the cores 502(A)-(N) being a large number of special purpose cores intended primarily for graphics and/or scientific (throughput); and 3) a coprocessor with the cores 502(A)-(N) being a large number of general purpose in-order cores. Thus, the processor 500 may be a general-purpose processor, coprocessor, or special-purpose processor, such as, for example, a network or communication processor, compression engine, graphics processor, GPGPU (general purpose graphics processing unit circuitry), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

A memory hierarchy includes one or more levels of cache unit(s) circuitry 504(A)-(N) within the cores 502(A)-(N), a set of one or more shared cache unit circuitry 506, and external memory (not shown) coupled to the set of integrated memory controller unit circuitry 514. The set of one or more shared cache unit circuitry 506 may include one or more mid-level caches, such as level 2 (L2), level 3 (L3), level 4 (L4), or other levels of cache, such as a last level cache (LLC), and/or combinations thereof. While in some embodiments ring-based interconnect network circuitry 512 interconnects the special purpose logic 508 (e.g., integrated graphics logic), the set of shared cache unit circuitry 506, and the system agent unit circuitry 510, alternative embodiments use any number of well-known techniques for interconnecting such units. In some embodiments, coherency is maintained between one or more of the shared cache unit circuitry 506 and cores 502(A)-(N).

In some embodiments, one or more of the cores 502(A)-(N) are capable of multi-threading. The system agent unit circuitry 510 includes those components coordinating and operating cores 502(A)-(N). The system agent unit circuitry 510 may include for example power control unit (PCU) circuitry and/or display unit circuitry (not shown). The PCU may be or may include logic and components needed for regulating the power state of the cores 502(A)-(N) and/or the special purpose logic 508 (e.g., integrated graphics logic). The display unit circuitry is for driving one or more externally connected displays.

The cores 502(A)-(N) may be homogenous or heterogeneous in terms of architecture instruction set; that is, two or more of the cores 502(A)-(N) may be capable of executing the same instruction set, while other cores may be capable of executing only a subset of that instruction set or a different instruction set.

Example Core Architectures

In-Order and Out-of-Order Core Block Diagram

Figure 6A:
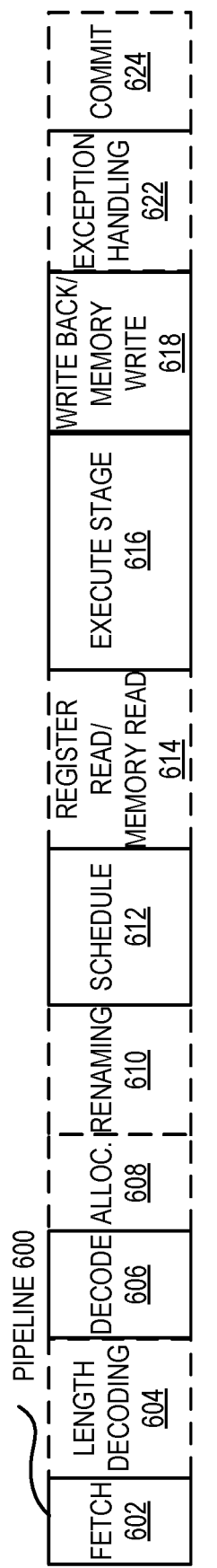
FIG. 6(A) is a block diagram illustrating both an example in-order pipeline and an example register renaming, out-of-order issue/execution pipeline according to embodiments.
Figure 6B:
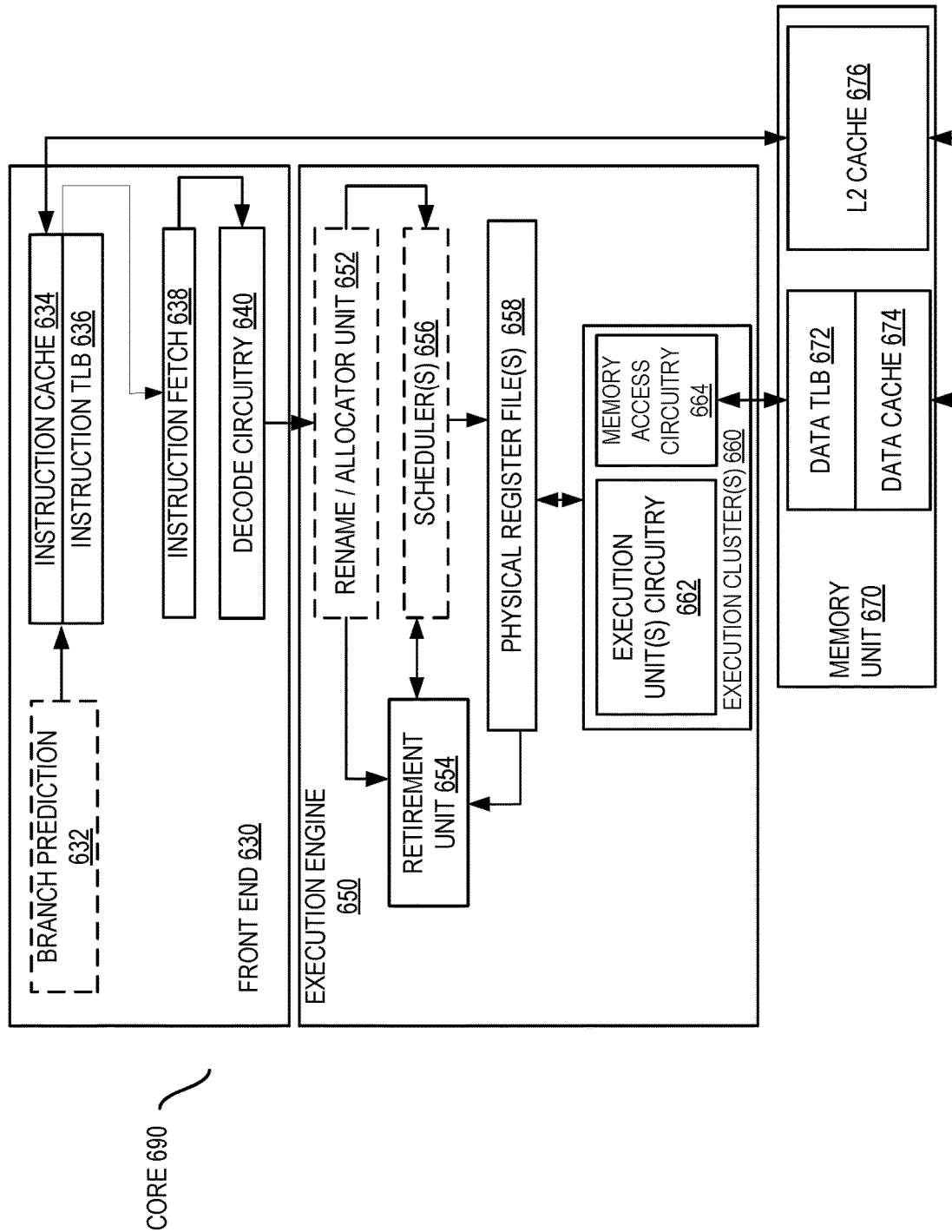
FIG. 6(B) is a block diagram illustrating both an example embodiment of an in-order architecture core and an example register renaming, out-of-order issue/execution architecture core to be included in a processor according to embodiments.

FIG. 6(A) is a block diagram illustrating both an example in-order pipeline and an example register renaming, out-of-order issue/execution pipeline according to embodiments. FIG. 6(B) is a block diagram illustrating both an example embodiment of an in-order architecture core and an example register renaming, out-of-order issue/execution architecture core to be included in a processor according to embodiments. The solid lined boxes in FIGS. 6(A)-(B) illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 6(A), a processor pipeline 600 includes a fetch stage 602, an optional length decode stage 604, a decode stage 606, an optional allocation stage 608, an optional renaming stage 610, a scheduling (also known as a dispatch or issue) stage 612, an optional register read/memory read stage 614, an execute stage 616, a write back/memory write stage 618, an optional exception handling stage 622, and an optional commit stage 624. One or more operations can be performed in each of these processor pipeline stages. For example, during the fetch stage 602, one or more instructions are fetched from instruction memory, during the decode stage 606, the one or more fetched instructions may be decoded, addresses (e.g., load store unit (LSU) addresses) using forwarded register ports may be generated, and branch forwarding (e.g., immediate offset or a link register (LR)) may be performed. In one embodiment, the decode stage 606 and the register read/memory read stage 614 may be combined into one pipeline stage. In one embodiment, during the execute stage 616, the decoded instructions may be executed, LSU address/data pipelining to an Advanced Microcontroller Bus (AHB) interface may be performed, multiply and add operations may be performed, arithmetic operations with branch results may be performed, etc.

By way of example, the example register renaming, out-of-order issue/execution core architecture may implement the pipeline 600 as follows: 1) the instruction fetch 638 performs the fetch and length decoding stages 602 and 604; 2) the decode unit circuitry 640 performs the decode stage 606; 3) the rename/allocator unit circuitry 652 performs the allocation stage 608 and renaming stage 610; 4) the scheduler unit(s) circuitry 656 performs the schedule stage 612; 5) the physical register file(s) unit(s) circuitry 658 and the memory unit circuitry 670 perform the register read/memory read stage 614; the execution cluster 660 perform the execute stage 616; 6) the memory unit circuitry 670 and the physical register file(s) unit(s) circuitry 658 perform the write back/memory write stage 618; 7) various units (unit circuitry) may be involved in the exception handling stage 622; and 8) the retirement unit circuitry 654 and the physical register file(s) unit(s) circuitry 658 perform the commit stage 624.

FIG. 6(B) shows processor core 690 including front-end unit circuitry 630 coupled to an execution engine unit circuitry 650, and both are coupled to a memory unit circuitry 670. The core 690 may be a reduced instruction set computing (RISC) core, a complex instruction set computing (CISC) core, a very long instruction word (VLIW) core, or a hybrid or alternative core type. As yet another option, the core 690 may be a special-purpose core, such as, for example, a network or communication core, compression engine, coprocessor core, general purpose computing graphics processing unit (GPGPU) core, graphics core, or the like.

The front-end unit circuitry 630 may include branch prediction unit circuitry 632 coupled to an instruction cache unit circuitry 634, which is coupled to an instruction translation lookaside buffer (TLB) 636, which is coupled to instruction fetch unit circuitry 638, which is coupled to decode unit circuitry 640. In one embodiment, the instruction cache unit circuitry 634 is included in the memory unit circuitry 670 rather than the front-end unit circuitry 630. The decode unit circuitry 640 (or decoder) may decode instructions, and generate as an output one or more micro-operations, micro-code entry points, microinstructions, other instructions, or other control signals, which are decoded from, or which otherwise reflect, or are derived from, the original instructions. The decode unit circuitry 640 may further include an address generation unit circuitry (AGU, not shown). In one embodiment, the AGU generates an LSU address using forwarded register ports, and may further perform branch forwarding (e.g., immediate offset branch forwarding, LR register branch forwarding, etc.). The decode unit circuitry 640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 690 includes a microcode ROM (not shown) or other medium that stores microcode for certain macroinstructions (e.g., in decode unit circuitry 640 or otherwise within the front-end unit circuitry 630). In one embodiment, the decode unit circuitry 640 includes a micro-operation (micro-op) or operation cache (not shown) to hold/cache decoded operations, micro-tags, or micro-operations generated during the decode or other stages of the processor pipeline 600. The decode unit circuitry 640 may be coupled to rename/allocator unit circuitry 652 in the execution engine unit circuitry 650.

The execution engine circuitry 650 includes the rename/allocator unit circuitry 652 coupled to a retirement unit circuitry 654 and a set of one or more scheduler(s) circuitry 656. The scheduler(s) circuitry 656 represents any number of different schedulers, including reservations stations, central instruction window, etc. In some embodiments, the scheduler(s) circuitry 656 can include arithmetic logic unit (ALU) scheduler/scheduling circuitry, ALU queues, arithmetic generation unit (AGU) scheduler/scheduling circuitry, AGU queues, etc. The scheduler(s) circuitry 656 is coupled to the physical register file(s) circuitry 658. Each of the physical register file(s) circuitry 658 represents one or more physical register files, different ones of which store one or more different data types, such as scalar integer, scalar floating point, packed integer, packed floating point, vector integer, vector floating point,, status (e.g., an instruction pointer that is the address of the next instruction to be executed), etc. In one embodiment, the physical register file(s) unit circuitry 658 includes vector registers unit circuitry, writemask registers unit circuitry, and scalar register unit circuitry. These register units may provide architectural vector registers, vector mask registers, general-purpose registers, etc. The physical register file(s) unit(s) circuitry 658 is overlapped by the retirement unit circuitry 654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register maps and a pool of registers; etc.). The retirement unit circuitry 654 and the physical register file(s) circuitry 658 are coupled to the execution cluster(s) 660. The execution cluster(s) 660 includes a set of one or more execution unit circuitry 662 and a set of one or more memory access circuitry 664. The execution unit circuitry 662 may perform various arithmetic, logic, floating point, or other types of operations (e.g., shifts, addition, subtraction, multiplication) and on various types of data (e.g., scalar floating point, packed integer, packed floating point, vector integer, vector floating point). While some embodiments may include a number of execution units or execution unit circuitry dedicated to specific functions or sets of functions, other embodiments may include only one execution unit circuitry or multiple execution units/execution unit circuitry that all perform all functions. The scheduler(s) circuitry 656, physical register file(s) unit(s) circuitry 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler circuitry, physical register file(s) unit circuitry, and/or execution cluster—and in the case of a separate memory access pipeline, certain embodiments are implemented in which only the execution cluster of this pipeline has the memory access unit(s) circuitry 664). It should also be understood that where separate pipelines are used, one or more of these pipelines may be out-of-order issue/execution and the rest in-order.

In some embodiments, the execution engine unit circuitry 650 may perform load store unit (LSU) address/data pipelining to an Advanced Microcontroller Bus (AHB) interface (not shown), and address phase and writeback, data phase load, store, and branches.

The set of memory access circuitry 664 is coupled to the memory unit circuitry 670, which includes data TLB unit circuitry 672 coupled to a data cache circuitry 674 coupled to a level 2 (L2) cache circuitry 676. In one example embodiment, the memory access unit circuitry 664 may include a load unit circuitry, a store address unit circuit, and a store data unit circuitry, each of which is coupled to the data TLB circuitry 672 in the memory unit circuitry 670. The instruction cache circuitry 634 is further coupled to a level 2 (L2) cache unit circuitry 676 in the memory unit circuitry 670. In one embodiment, the instruction cache 634 and the data cache 674 are combined into a single instruction and data cache (not shown) in L2 cache unit circuitry 676, a level 3 (L3) cache unit circuitry (not shown), and/or main memory. The L2 cache unit circuitry 676 is coupled to one or more other levels of cache and eventually to a main memory.

The core 690 may support one or more instructions sets (e.g., the x86 instruction set (with some extensions that have been added with newer versions); the MIPS instruction set; the ARM instruction set (with optional additional extensions such as NEON)), including the instruction(s) described herein. In one embodiment, the core 690 includes logic to support a packed data instruction set extension (e.g., AVX1, AVX2), thereby allowing the operations used by many multimedia applications to be performed using packed data.

Example Execution Unit(s) Circuitry

Figure 7:
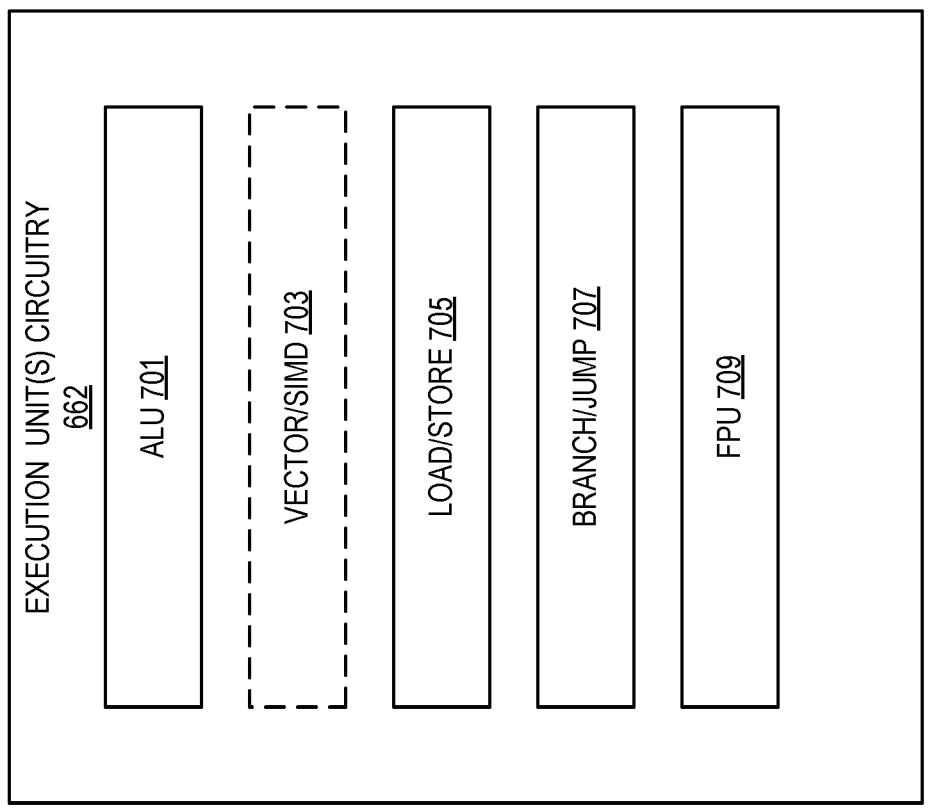
FIG. 7 illustrates embodiments of execution unit(s) circuitry, such as execution unit(s) circuitry of FIG. 6(B).

FIG. 7 illustrates embodiments of execution unit(s) circuitry, such as execution unit(s) circuitry 662 of FIG. 6(B). As illustrated, execution unit(s) circuitry 662 may include one or more ALU circuits 701, vector/SIMD unit circuits 703, load/store unit circuits 705, and/or branch/jump unit circuits 707. ALU circuits 701 perform integer arithmetic and/or Boolean operations. Vector/SIMD unit circuits 703 perform vector/SIMD operations on packed data (such as SIMD/vector registers). Load/store unit circuits 705 execute load and store instructions to load data from memory into registers or store from registers to memory. Load/store unit circuits 705 may also generate addresses. Branch/jump unit circuits 707 cause a branch or jump to a memory address depending on the instruction. FPU circuits 709 perform floating-point arithmetic. The width of the execution unit(s) circuitry 662 varies depending upon the embodiment and can range from 16-bit to 1,024-bit. In some embodiments, two or more smaller execution units are logically combined to form a larger execution unit (e.g., two 128-bit execution units are logically combined to form a 256-bit execution unit).

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
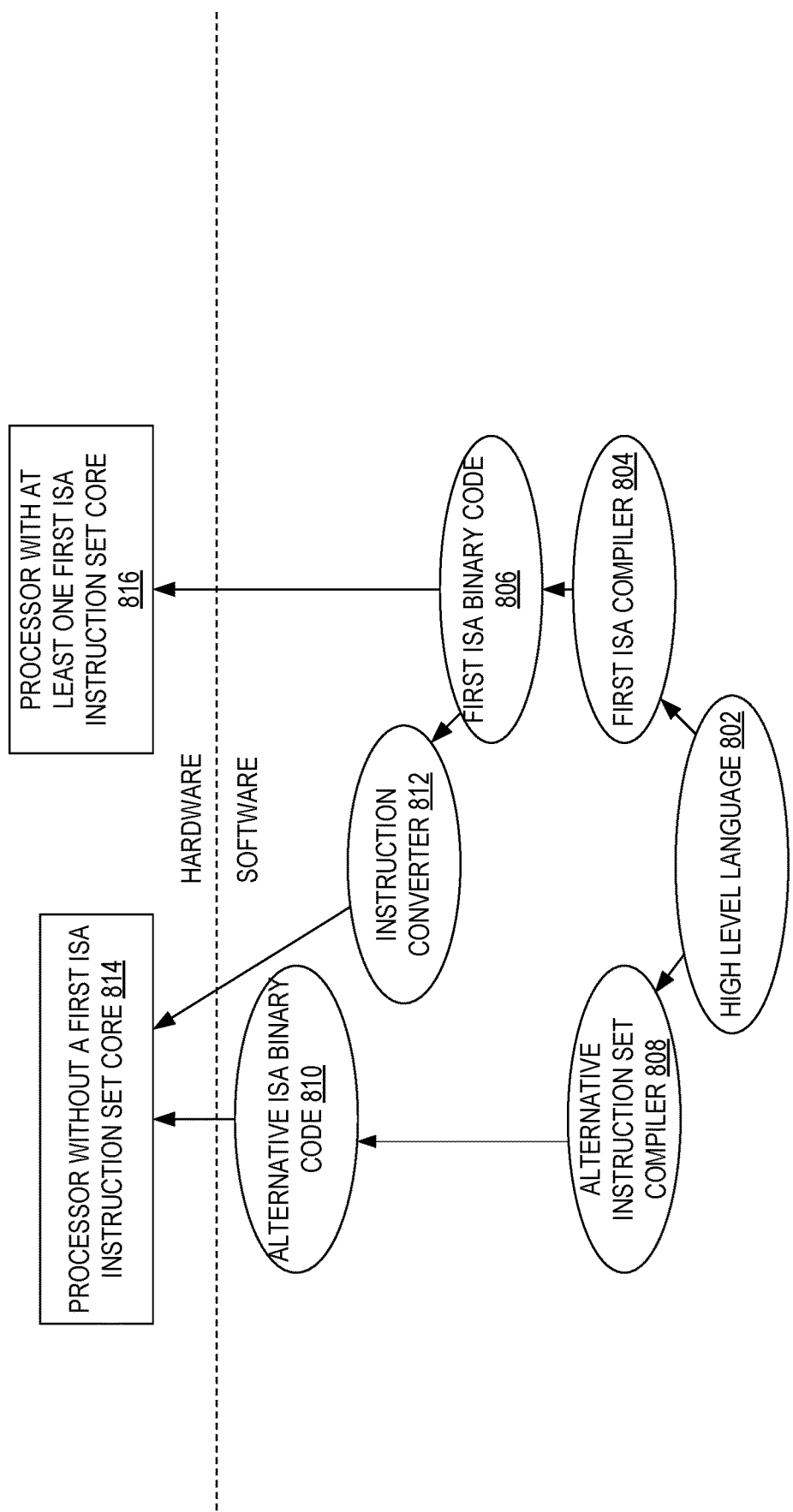
FIG. 8 illustrates a block diagram contrasting the use of a software instruction converter to convert binary instructions in a source instruction set to binary instructions in a target instruction set according to embodiments.

FIG. 8 illustrates a block diagram contrasting the use of a software instruction converter to convert binary instructions in a source instruction set to binary instructions in a target instruction set according to embodiments. In the illustrated embodiment, the instruction converter is a software instruction converter, although alternatively the instruction converter may be implemented in software, firmware, hardware, or various combinations thereof. FIG. 8 shows a program in a high-level language 802 may be compiled using a first ISA compiler 804 to generate first ISA binary code 806 that may be natively executed by a processor with at least one first instruction set core 816. The processor with at least one first ISA instruction set core 816 represents any processor that can perform substantially the same functions as an Intel® processor with at least one first ISA instruction set core by compatibly executing or otherwise processing (1) a substantial portion of the instruction set of the first ISA instruction set core or (2) object code versions of applications or other software targeted to run on an Intel processor with at least one first ISA instruction set core, in order to achieve substantially the same result as a processor with at least one first ISA instruction set core. The first ISA compiler 804 represents a compiler that is operable to generate first ISA binary code 806 (e.g., object code) that can, with or without additional linkage processing, be executed on the processor with at least one first ISA instruction set core 816. Similarly, FIG. 8 shows the program in the high-level language 802 may be compiled using an alternative instruction set compiler 808 to generate alternative instruction set binary code 810 that may be natively executed by a processor without a first ISA instruction set core 814. The instruction converter 812 is used to convert the first ISA binary code 806 into code that may be natively executed by the processor without a first ISA instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation, or any other process, allows a processor or other electronic device that does not have a first ISA instruction set processor or core to execute the first ISA binary code 806.

Additional Description

Program code may be applied to input instructions to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Embodiments of the mechanisms disclosed herein may be implemented in hardware, software, firmware, or a combination of such implementation approaches. Embodiments may be implemented as computer programs or program code executing on programmable systems comprising at least one processor, a storage system (including volatile and non-volatile memory and/or storage elements), at least one input device, and at least one output device.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

In the preceding description, numerous specific details, such as component and system configurations, may be set forth in order to provide a more thorough understanding of embodiments. It will be appreciated, however, by one skilled in the art, that embodiments may be practiced without such specific details.

Additionally, some well-known structures, circuits, and other features have not been shown in detail, to avoid unnecessarily obscuring the description.

As used in the description and the drawings, items referred to as blocks, boxes, units, engines, etc. may represent and/or be implemented in hardware, logic gates, memory cells, circuits, circuitry, etc.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

As used in this description and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments, a "/" character between terms may mean that an embodiment may include or be implemented using, with, and/or according to the first term and/or the second term (and/or any other additional terms).

In this specification, operations in flow diagrams may have been described with reference to example embodiments of other figures. However, it should be understood that the operations of the flow diagrams may be performed by embodiments other than those discussed with reference to other figures, and the embodiments discussed with reference to other figures may perform operations different than those discussed with reference to flow diagrams. Furthermore, while the flow diagrams in the figures show a particular order of operations performed by certain embodiments, it should be understood that such order is provided as an example (e.g., alternative embodiments may perform the operations in a different order, combine certain operations, overlap certain operations, etc.).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   a plurality of address decoders; and
   a plurality of configuration storage locations, each of the configuration storage locations corresponding to one of the plurality of address decoders to configure the corresponding one of the plurality of address decoders to decode based on a corresponding one of a plurality of decode rules;
   wherein each of the plurality of configuration storage locations is allocated to one of a plurality of memory tiers.

2. The apparatus of claim 1, wherein at least a first of the plurality of memory tiers is differentiated from at least a second of the plurality of memory tiers by a difference between a format of a first configuration storage location corresponding to the first of the plurality of memory tiers and a format of a second configuration storage location corresponding to the second of the plurality of memory tiers.

3. The apparatus of claim 2, wherein the difference is based at least in part on a memory performance characteristic.

4. The apparatus of claim 3, wherein the memory performance characteristic is bandwidth.

5. The apparatus of claim 3, wherein the memory performance characteristic is latency.

6. The apparatus of claim 2, wherein the format of the first configuration storage location includes a first field to distinguish between a first device type and a second device type.

7. The apparatus of claim 6, wherein the first device type includes memory and the second device type includes accelerator.

8. The apparatus of claim 6, wherein the first device type includes volatile and the second device type includes persistent.

9. The apparatus of claim 2, wherein the format of the first configuration storage location includes a first field for a base address.

10. The apparatus of claim 9, wherein the format of the first configuration storage location includes a second field for a limit.

11. The apparatus of claim 9, wherein the difference is based at least in part on the format of the first configuration location having no field for a device type.

12. The apparatus of claim 9, wherein the difference is based at least in part on the format of the second configuration location having no field for a base address.

13. A method comprising:
   initiating, by a processor, a memory access transaction to a first memory address;
   accessing one of a plurality of configuration storage locations to determine a decode rule corresponding to an address range including the first memory address, wherein each of the plurality of configuration storage locations is allocated to one of a plurality of memory tiers;
   decoding, by an address decoder in one of a plurality of decoder pools, the first memory address to identify a memory device hosting a corresponding second memory address, wherein the decoding is based on the decode rule; and
   accessing the memory device to perform the memory access transaction.

14. The method of claim 13, further comprising programming the one of the plurality of configuration storage locations with the decoding rule to assign the memory device to one of the plurality of memory tiers.

15. The method of claim 13, wherein at least a first of the plurality of memory tiers is differentiated from at least a second of the plurality of memory tiers by a difference between a format of a first configuration storage location corresponding to the first of the plurality of memory tiers and a format of a second configuration storage location corresponding to the second of the plurality of memory tiers.

16. The method of claim 15, wherein the difference is based at least in part on a memory performance characteristic.

17. The method of claim 16, wherein the memory performance characteristic is bandwidth or latency.

18. A system comprising:
a plurality of memory devices;
a plurality of address decoders; and
a plurality of configuration storage locations, each of the configuration storage locations corresponding to one of the plurality of address decoders to configure the corresponding one of the plurality of address decoders to decode based on a corresponding one of a plurality of decode rules;
wherein each of the plurality of configuration storage locations is allocated to one of a plurality of memory tiers, the plurality of memory tiers including the plurality of memory devices.

19. The system of claim 18, wherein at least a first of the plurality of memory tiers is differentiated from at least a second of the plurality of memory tiers by a difference between a format of a first configuration storage location corresponding to the first of the plurality of memory tiers and a format of a second configuration storage location corresponding to the second of the plurality of memory tiers.

20. The system of claim 19, wherein the difference is based at least in part on a memory performance characteristic.

* * * * *